Dec. 20, 1966 T. J. O'CONNOR 3,293,163
METHOD OF MAINTAINING SPACING IN ELECTRIC-DISCHARGE
AND ELECTRO-CHEMICAL MACHINING
Filed April 10, 1964

INVENTOR.
THOMAS J. O'CONNOR
BY *Whittemore,*
*Halbert & Belknap*
ATTORNEYS

United States Patent Office 3,293,163
Patented Dec. 20, 1966

3,293,163
METHOD OF MAINTAINING SPACING IN ELECTRIC-DISCHARGE AND ELECTRO-CHEMICAL MACHINING
Thomas J. O'Connor, Ann Arbor, Mich., assignor to Easco Products, Inc., Ann Arbor, Mich., a corporation of Michigan
Filed Apr. 10, 1964, Ser. No. 358,704
7 Claims. (Cl. 204—143)

The invention relates to electrical machining of a material which is a conductor of electricity and refers more specifically to means for and a method of maintaining a predetermined spacing between an electrode and a workpiece during electrical machining of the workpiece.

In the past it has been known in electric-discharge and electro-chemical machining of conducting materials to maintain a predetermined spacing between a workpiece being eroded used as one electrode and a second electrode between which an electric signal is passed and to control the spacing in response to the electric signal passing between the workpiece and electrode. Gravity and spring feed in one direction in conjunction with positive electro-mechanical and hydro-mechanical feed in the other direction have been known in maintaining the spacing of the electrode and workpiece in such systems.

The maintaining of spacing between a workpiece and an electrode by prior known electric and hydraulic movements to an exact tolerance is difficult as adjustment of the spacing requires an error in spacing before adjustment is initiated. In addition prior means for maintaining a predetermined spacing between a workpiece and an electrode have been complicated and therefore relatively expensive and subject to error.

It is therefore one of the objects of the presnt invention to provide improved means for maintaining a predetermined space between an electrode and a workpiece.

Another object is to provide an improved method of maintaining a predetermined space between an electrode and a workpiece.

Another object is to provide an improved method of machining a workpiece electrically including maintaining required spacing between a workpiece and an electrode.

Another object is to provide a fluid for use as a dielectric or electrolyte including a plurality of fine rigid particles suspended therein.

Another object is to provide a fluid as set forth above wherein the rigid members are substantially spherical and between two microns and ten thousandths of an inch in diameter.

Another object is to provide a fluid as set forth above wherein the rigid spherical members are insulators and chemically inert with regard to the fluid.

Another object is to provide a method of maintaining a predetermined spacing between a workpiece and electrode comprising circulating a fluid including small rigid particles suspended therein between the workpiece and electrode.

Another object is to provide a method of maintaining spacing between a workpiece and electrode as set forth above wherein the fluid having the rigid particles suspended therein is circulated under pressure.

Another object is to provide a method of maintaining spacing between a workpiece and electrode as set forth above and further including the step of periodically positively driving the electrode away from the workpiece.

Another object is to provide a method of maintaining a spacing between a workpiece and an electrode as set forth above and further including positively driving the electrode in only one direction with respect to the workpiece.

Another object is to provide electric-discharge machining apparatus including an electrode, means for advancing the electrode toward a workpiece and a dielectric fluid having discrete rigid spherical members suspended therein circulated between the electrode and workpiece.

Another object is to provide electro-chemical machining apparatus including an electrode, means for advancing the electrode toward a workpiece, and an electrolyte having discrete rigid spherical members suspended therein positioned between the elecrode and workpiece.

Another object is to provide a method of and means for maintaining predetermined spacing between an electrode and a workpiece in apparatus for electrically machining conducting materials which is simple, economical and efficient.

Other objects and features of the invention will become apparent as this description proceeds, especially when taken in conjunction with the accompanying drawing illustrating a preferred embodiment of the invention, wherein.

Figure 1:
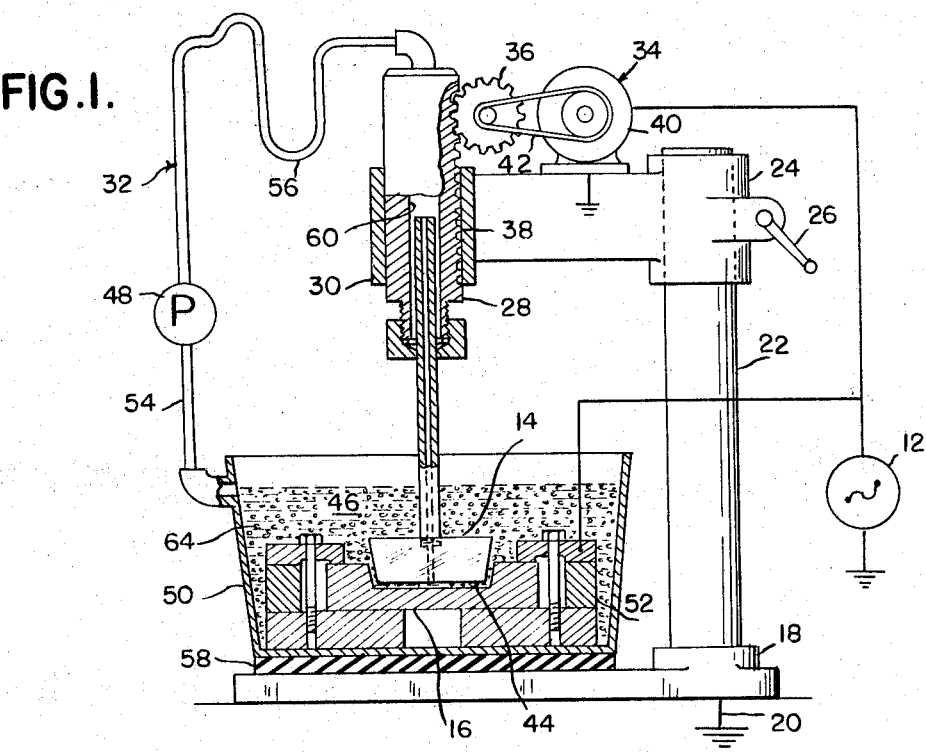
FIGURE 1 is a partly diagrammatic, partly schematic presentation of electric-discharge machining apparatus with which the dielectric of the invention for maintaining spacing between the electrode and the workpiece may be used and with which the method of the invention may be practiced.

With particular reference to the figures of the drawing, one embodiment of the present invention will now be considered in detail.

As shown in FIGURE 1, the electric-discharge machining apparatus 10 is connected to the usual source of electric energy 12 with the eletcrode 14 and the workpiece 16 connected to opposite sides of the source of electric energy. In use a dielectric fluid 46 having discrete rigid particles 64 suspended therein is circulated between the electrode and workpiece to maintain a predetermined minimum spacing therebetween.

More specifically, the electric-discharge machining apparatus 10, as shown in FIGURE 1, includes the base 18 grounded at 20, shaft 22 on which arm 24 is movable vertically, and locking structure 26 for locking the arm 24 in a fixed vertical position. The electric-discharge machining apparatus 10 further includes a vertically adjustable electrode holder 28 mounted in bearing 30 on arm 26, structure 32 for circulating a dielectric through the electrode 14 and between the electrode 14 and workpiece 16 and the apparatus 34 for automatically adjusting spacing between the electrode and workpiece in response to the electric signal across the workpiece 16 and electrode 14.

The apparatus 34 for adjusting the spacing in opposite directions between the workpiece 16 and electrode 14 includes the pinion 36 engaged with the rack portion 38 of electrode holder 28 and motor 40. Motor 40 is connected through belt drive 42 to drive pinion 36 in opposite directions to lower and raise the electrode holder 28.

The direction of rotation of motor 34 is determined in accordance with the electric signal between the electrode 14 and workpiece 16 and is of a magnitude and in a direction so as to maintain the spacing between the workpiece and electrode substantially constant in accordance with the usual electric-discharge machining procedures.

Structure 32 for circulating dielectric 46 under pressure through hollow electrode 14 and the space 44 between the electrode 14 and workpiece 16 includes the dielectric pump 48, the tank 50 in which the workpiece is secured by workpiece mounting structure 52, the rigid conduit 54 between the tank 50 and pump 48, and the flexible conduit 56 between the pump 48 and the electrode holder 28.

The tank 50 is insulated from the base 18 by insulating pad 58. Thus the dielectric path on actuation of pump 48 is from the tank 50, rigid conduit 54, pump 48, flexible conduit 56, down through the passage 60 in electrode holder 28, through the opening 62 in the hollow electrode 14, through the space 44 between the workpiece 16 and electrode 14, and back into the tank 50.

The dielectric 46 which may be example be a light machine oil or an oil and water mixture has small rigid spherical particles suspended therein. The particles 64 are chemically inert material with respect to the electrolyte, the workpiece and electrode, and are electrical insulators. Further the particles 64 are substantially spherical and are relatively small being for example of between two microns and ten thousandths of an inch in diameter or 400 to 100 grit. The particles 64 may be glass beads for example.

Preferably sufficient particles 64 are suspended in the dielectric 46 to provide a dielectric having a muddy consistency although substantial advantage is evident with the quantity of particles suspended in the dielectric 64 varied over a wide range.

In operation during the usual control of the electrode holder 28 of the apparatus 10 through the motor 34, the electrode holder 28 is generally fed toward the workpiece 16 and at any time it feeds toward the workpiece 16 at a rate greater than the erosion rate of the workpiece 16 arcing occurs to cause the motor 34 to back the electrode 14 away from the workpiece 16. At such times the space 44 can become so small that damage may occur to the workpiece due to the arcing between the electrode and the workpiece.

In accordance with the invention the small spherical members 64 positioned between the electrode and workpiece define a minimum space 44 which is positively maintained. Thus movement of the electrode into contact or too close to the workpiece 16 with a dielectric having particles 64 suspended therein is impossible.

The particles 64 do not affect the reverse movement of the electrode 14 so that in the usual operation of an electric-discharge machining apparatus 10 the operation is not affected unless the downward movement of the electrode becomes too great, at which time positive maintenance of the spacing 44 is provided. A much smaller operating space 44 may thus be maintained without danger of serious arcing between the workpiece 16 and electrode 14.

In addition, with proper setting of the motor 34 to drive the electrode 14 in a downward direction, at any time the spacing between the electrode and workpiece is greater than the diameter of the spherical members 64, the particularly close spacing can be maintained with only a slight oscillation of the electrode holder 28 in a vertical direction in accordance with the operation of many electric-discharge machines on the market today. With a slight oscillation of the electrode holder 28 the particles 64 are permitted to move through the space 44 while intermittently supporting the electrode 14 at an exact predetermined spacing from the workpiece 16.

In fact, the motor 34 might be entirely removed and the electrode holder 28 fed downward by gravity with a slight vertical oscillating motion provided at a frequency of for example sixty to one thousand cycles per second. Thus the spacing 44 could be maintained by essentially mechanical means. Alternatively the motor may be used to drive the electrode holder 28 in an upward direction only when the space between the electrode and workpiece becomes less than a predetermined minimum with return movement provided by gravity or springs.

Figure 2:
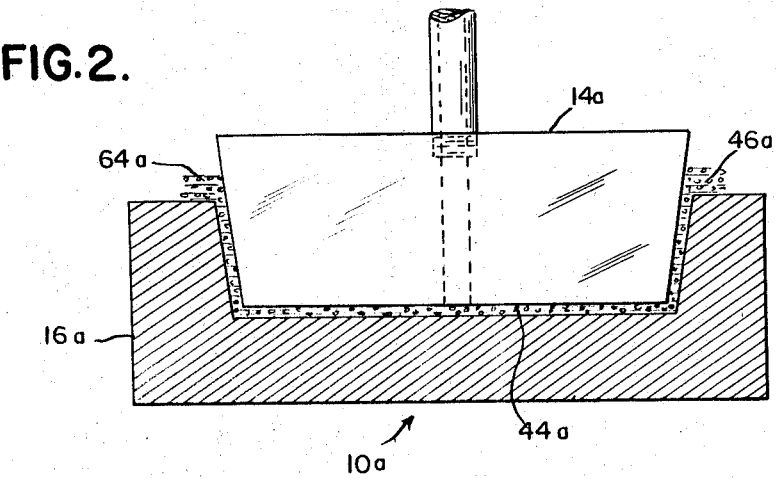
FIGURE 2 is an enlarged view of a portion of electro-chemical machining apparatus similar to the apparatus of FIGURE 1 with which the electrolyte of the invention may be used.

In an electro-chemical machining operation as illustrated diagrammatically in FIGURE 2 with apparatus similar to that shown in FIGURE 1 where similar elements have been given similar reference characters, followed by the suffix $a$, the particles 64$a$ in the electrolyte will serve as indicated above to maintain a predetermined space 44$a$ between the electrode 14$a$ and the workpiece 16$a$.

In the electro-chemical operation however the particles 64$a$ have a further function in that they serve to scour the workpiece 16$a$ and electrode 14$a$ to some extent as they are moved through the space 44$a$ whereby the oxides and other undesirable substances which form polarizing films over the workpiece or electrode during electro-chemical machining are constantly removed during the machining to improve the speed and quality of the machining.

The scouring action of particles 64 is a great improvement over the past practice of either physically washing the surfaces contaminated during electro-chemical machining or increasing the velocity of electrolyte or both.

While one embodiment of the invention has been disclosed in detail herein, and other modifications and embodiments thereof suggested, it will be understood that still other modifications and embodiments are possible. It is therefore the intention to include all modifications and embodiments of the above disclosure as are defined by the appended claims within the scope of the invention.

What I claim as my invention is:

1. In an electric-machining process of removing material from an electrically conductive workpiece by means of an electrode tool, including maintaining a space between said tool and said workpiece by relative movement of said tool to said workpiece, supplying a working fluid to said space and impressing an electric current across said space, the improvement comprising maintaining said space between said tool and said workpiece by including in said working fluid an effective amount of electrically insulating material substantially on a spherical configuration having a diameter between about two microns and ten-thousandths of an inch.

2. The process as set forth in claim 1 wherein the insulating material is chemically inert.

3. The process as set forth in claim 1 and further including circulating the fluid between the electrode tool and workpiece under pressure.

4. The process as set forth in claim 1 and further including oscillating the electrode tool toward and away from the workpiece.

5. The process as set forth in claim 1 and further including gravity feeding the electrode tool toward the workpiece.

6. The process as set forth in claim 1 and further including positively feeding the electrode tool away from the workpiece in response to the space between the workpiece and electrode tool reaching a predetermined minimum dimension.

7. The process as set forth in claim 1 wherein the fluid is a light oil and the insulating material is glass beads.

References Cited by the Examiner

UNITED STATES PATENTS

| 2,385,198 | 9/1945 | Engle | 204—143 |
| 2,766,364 | 10/1956 | Higging et al. | 219—69 |
| 2,838,652 | 6/1958 | Porterfield | 219—69 |
| 3,061,708 | 10/1962 | Pfau | 219—69 |

FOREIGN PATENTS

| 748,485 | 5/1956 | Great Britain. |
| 789,293 | 1/1958 | Great Britain. |

JOHN H. MACK, *Primary Examiner.*

R. MIHALEK, *Assistant Examiner.*